Sept. 20, 1960     I. SWERLICK ET AL     2,952,878
STRETCHABLE CRYSTALLINE POLYOXYMETHYLENE FILM AND PROCESS
FOR PROVIDING SUCH FILM BY ROLLING
Filed Aug. 2, 1956
FIG. 2
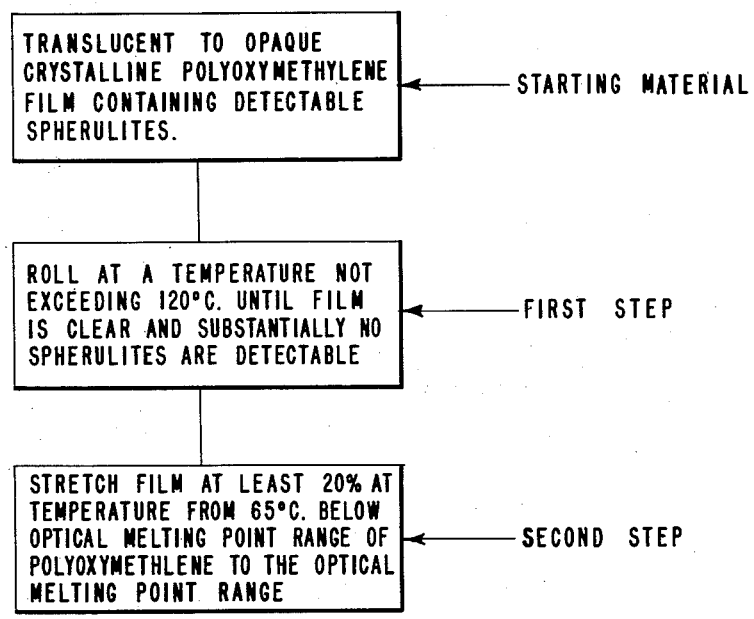
FIG. I
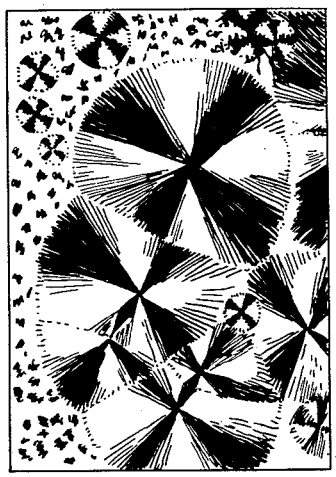
INVENTORS
ISADORE SWERLICK
FRANK P. GAY
BY
ATTORNEY

United States Patent Office

2,952,878
Patented Sept. 20, 1960

2,952,878

STRETCHABLE CRYSTALLINE POLYOXYMETHYLENE FILM AND PROCESS FOR PROVIDING SUCH FILM BY ROLLING

Isadore Swerlick, Tonawanda, N.Y., and Frank P. Gay, Wilmington, Del., assignors to E. I. du Pont de Nemours and Company, Wilmington, Del., a corporation of Delaware Filed Aug. 2, 1956, Ser. No. 601,843

8 Claims. (Cl. 18—48)

This invention relates to polyoxymethylene film, and more particularly, to a process of enhancing the physical properties of crystalline polyoxymethylene film.

Polyoxymethylene film is fully described and claimed in United States application Serial No. 408,172 issued as U.S. Patent No. 2,768,994, filed February 4, 1954, in the name of R. N. MacDonald. Polyoxymethylene films are highly crystalline in nature, and depending upon the manner in which they are formed, the degree of crystallinity may range from 50 to about 72%. The density of the theoretically completely crystalline polymer has been determined as 1.506 grams/cc. while the completely amorphous polymer has a density determined at 1.277 grams/cc. The crystalline melting point (optical melting point) for polyoxymethylene films is within the range of 183° C.–185° C.

Polyoxymethylene films formed from a melt by the usual expedients, e.g., by melt-pressing or melt-extrusion followed by quenching, are normally lacking in clarity. In fact, the films, however formed, range from substantially opaque to translucent, and are characterized generally by their opalescent or hazy appearance. Attempts to improve the clarity and also the toughness, as well as other physical properties of the film by conventional orientation techniques, show that the film is difficult to handle and that it is unique in its behavior. The difficulties involved in improving the physical properties and clarity of the film are believed to be due to the presence of relatively large spherulites in its crystalline structure, i.e., spherulites detectable with a visible light microscope using crossed Nicols. This also appears to account for the high degree of haze in these films. Basically, the problem encountered in attempting to clarify and to enhance the film toughness, along with improving other physical properties, has been the failure of attempts to biaxially orient the film by the conventional technique of drawing (stretching) the film in two directions. Under all circumstances, i.e., at temperatures up to the optical melting point of the film, it has not been possible to stretch (in two mutually perpendicular directions) a polyoxymethylene film formed from a melt without encountering film breakage before the film has been elongated to an extent necessary to obtain a reasonable improvement in toughness, clarity, and other physical properties.

The characteristic structure of spherulites in crystalline polymer is now well-known—being fully described, for example, by G. Schuur in "Mechanism of the Crystallization of High Polymers," Journal of Polymer Science, vol. 11, No. 5, pp. 385–396 (1953); and by A. Keller in "The Spherulitic Structure of Crystalline Polymers," Journal of Polymer Science, vol. 17, pp. 291–308 (1955). Briefly spherulitic structure is usually recognizable, when viewed under the polarizing microscope employing crossed Nicols, by birefringent regions with characteristic extinction patterns possessing four-fold symmetry, generally described as Maltese cross extinction patterns. Figure 1 of the accompanying drawing illustrates the spherulitic structure of untreated polyoxymethylene film. The magnification in Figure 1 is such that one millimeter represents 10 microns.

An object of this invention, therefore, is to provide a process for clarifying and for enhancing the physical properties, in general, of translucent to opaque crystalline polyoxymethylene films. Another object is to provide clear, stretchable, tough crystalline polyoxymethylene films having enhanced flex life and high impact strength. Still another object is to provide oriented, preferably balanced, clear, tough crystalline polyoxymethylene films having enhanced flex life and high impact and tensile strength. These and other objects will more clearly appear hereinafter.

The term "stretchable," as will be applied to the polyoxymethylene film produced in accordance with the present invention means that the film can be stretched to an extent of at least 20–25% in two mutually perpendicular directions without breaking, stretching being carried out at a temperature below the optical melting point range but no lower than 65° C. below the optical melting point range.

The foregoing objects are realized by the present invention which, briefly stated, comprises pressure-rolling translucent to opaque crystalline polyoxymethylene film containing spherulites detectable with a visible light microscope using crossed Nicols, at a roll temperature not exceeding 120° C. until the film is clear (transparent) and the spherulites are substantially no longer detectable with a visible light microscope, i.e., until, at most, only isolated spherulites or fragments of spherulites are detectable with a visible light microscope. The resulting clear stretchable film is useful in applications where a tough film of high flex life is desirable. To secure increased tensile strength, the rolled film is thereafter stretched while maintained at a temperature within the range of from the optical melting point range of the polyoxymethylene to a temperature no lower than 65° C. below said optical melting point range. Figure 2 of the drawing is a flow diagram of the process of the present invention.

The polyoxymethylene films with which the present invention is concerned are those described and claimed in the aforementioned United States Patent No. 2,768,994. These films are derived from polyoxymethylenes of relatively high molecular weight, e.g., number average molecular weight from 45,000–75,000 and above, and the ratio of weight average to number average molecular weight is usually within the range of 2/1 to 2.5/1. In preferred form, for preparing films of high toughness and impact strength, polyoxymethylenes having molecular weights in the upper portions of the aforementioned ranges are preferred. The present invention is equally applicable to other crystalline, spherulitic films which behave similarly to polyoxymethylene.

Polyoxymethylene film may be formed directly from a melt by (A) hot pressing a powdered or chipped polymer between plates to melt the polymer and shape a film, and thereafter rapidly quenching the formed film or permitting it to cool slowly, or (B) extruding a molten polyoxymethylene through a slot-type orifice to form a film which is either rapidly quenched or permitted to remain momentarily at an elevated temperature followed by quenching. Films formed in this manner are hazy (the intensity of haze ranging from substantial opacity to translucency), and are moderately tough. As emphasized hereinbefore, the films cannot be stretched to any appreciable extent in two mutually perpendicular directions (as a way of enhancing the clarity, toughness and other strength properties) because the films will break, even when attempts are made to stretch the films at elevated temperatures near the optical melting point. These films are highly crystalline, crystallinity ranging from 50–72%, and the crystalline structure is spherulitic in nature, i.e., contains relatively large spherulites which are visible when viewed through a microscope utilizing plane polarized light and which are further evidenced by the haziness of the films. It has not been possible to form a satisfactory crystalline polyoxymethylene film containing relatively small spherulites, i.e., those not detectable with a visible light microscope, directly from a stable melt by quenching at extremely low temperatures (as represented by a Dry Ice/chloroform/carbon tetrachloride mixture or even in liquid nitrogen).

In its preferred form the process of the present invention is carried out by rolling a polyoxymethylene film to the extent necessary to convert the film from a condition of haziness (ranging in intensity from substantial opacity to translucency) to one which is substantially clear and free of haze. The extent to which the film must be elongated in the direction of rolling or the extent to which the thickness of the film is reduced during the rolling operation depends essentially upon the spherulitic nature of the initial film, that is, the number and size of the spherulites in the film. It is preferred to convert the film into a state of high clarity with a minimum of uni- or bi-directional rolling. The actual extent to which the film is elongated during the rolling operation may range from 1.5X to 3X or greater in some cases (in one or two directions), where X is the original dimension of the film in the direction of rolling. As a guide to determining the degree to which the film must be rolled to obtain substantial film clarity, it has been found that one can evaluate the degree of change in the internal film structure (effected by rolling) by determining the ratio of the change in film thickness ($\Delta T$) divided by the original thickness ($To$) to the change of film length ($\Delta L$) (in the direction of rolling) divided by the original length ($Lo$). This ratio may be expressed as $$\frac{\Delta T/To}{\Delta L/Lo}$$

and the ratio may be determined for each direction of rolling. In general, for rolling polyoxymethylene films, it has been found that when this ratio is 0.5 or less (in any direction of rolling) the resulting rolled film is substantially clear and transparent.

It is preferred to roll film in one direction and thereafter stretch the film in a direction perpendicular thereto to form a film having substantially balanced physical properties. Stretching may be carried out in the same direction in which the film was rolled or in two mutually perpendicular directions, this depending upon the end use for a given film. Generally, however, when a balanced film is desired, it will be necessary to stretch the rolled film in two directions.

The rolling operation is carried out at temperatures up to 120° C., and preferably from room temperature to 100° C. These temperatures refer to the actual surface temperature of the rolls, and the film itself is not heated. Stretching the rolled film, on the other hand, must be carried out at a temperature below the optical melting point range of the film, but not more than 65° C. below the optical melting point range. Preferably, the temperature of stretching should be within the range from 120° C.–180° C. These stretching temperatures refer to the actual film temperature just prior to stretching, the film temperature rising further during the stretching owing to the heat of stretching. The initial film temperature should not be so high as to cause the film to rise to excessively high temperatures (above the optical melting point) during the stretching operation, thereby losing coherency and resulting in film tearing.

The following examples of preferred embodiments further illustrate the principles and practice of this invention. In the examples, the physical properties of the films were measured in accordance with the following test procedures:

*Tenacity.*—The tenacity of the present film structures is based upon the initial cross-sectional area of the sample. Tenacity at break is determined by elongating the film sample at a rate of 100% per minute until the film sample breaks.

*Elongation.*—The value of elongation represents the extent to which the film is extended at breakage. Elongation is effected at the rate of 100% per minute.

*Initial tensile modulus.*—Initial tensile modulus is a measure of film stiffness, i.e., the higher the modulus the greater the stiffness. The modulus is taken from the slope of the initial or Hookian portion of the stress/strain curve at 1% elongation, the film being elongated at a rate of 100% per minute.

*Impact strength (falling ball test).*—In this test, a steel ball 2½" in diameter and weighing 1.045 kilograms is dropped onto a clamped sample of film, the diameter of which is 3". The minimum size sample for clamping in the 3" diameter clamp is a film sample 4" x 4". The film before testing is conditioned at 75° F. and 35% relative humidity. Upon calibrating the instrument employed in the test, the mean height for five free fall readings is obtained, and then the mean height for 10 film samples is determined by carrying out the test. The difference between these two heights, multiplied by the mass of the projectile is equal to the film impact strength which is recorded in kg.-cm./mil.

EXAMPLE 1

Powdered polyoxymethylene having a number average molecular weight of about 50,000 was melt-pressed between chrome plates at a temperature of 200° C. for 2 minutes under a pressure of about 200 tons/sq. ft. The formed film was immediately quenched in water at a temperature of about 4° C. This polyoxymethylene film was of the type described in the aforementioned United States Patent No. 2,768,994 and the film was hazy to the extent that it was not possible to read print through the film when the film was held about ¼" above a printed page. The film, when viewed through a polarizing microscope, showed the characteristic spherulitic structure illustrated in Figure 1.

A sheet of the melt-pressed film (at room temperature) four inches long, two inches wide and 10–12 mils thick was then rolled in the longitudinal direction of the film while maintaining the rolls at a temperature of about 21° C. The rolling mill was composed of two stainless steel rolls 4⅝ inches in diameter and 8 inches in length. The rolls had a crown of about 1 mil, and were rotated at a rate of 2 r.p.m. The film was passed through the rolls twice in order to convert the film to a substantially clear, tough film 8 inches long, 2 inches wide and 5–6 mils thick.

This film was observed in a polarizing microscope (cross Nicols) and substantially no spherulites were detectable. The film was then heated to a temperature of about 180° C. and stretched to an extent of about 100% (2X) of its original dimension without encountering film breakage. The original melt-pressed film (before rolling) could not be stretched in two directions under the same conditions to an extent of 20–25% without breaking.

EXAMPLE 2

The rolled film of Example 1 was heated to a temperature of about 180° C. and thereafter stretched to an extent of 30% in a direction transverse to the direction in which the film was rolled.

EXAMPLE 3

The melt-pressed film described in Example 1 was rolled in the same apparatus described in Example 1 under conditions where the roll and film temperature (film temperature prior to rolling) were both 30° C. The initial melt-pressed film was 10–12 mils in thickness. The film was rolled (one pass through the rolls) in the direction parallel to one dimension of the film, and thereafter rolled (one pass through the rolls) in a direction transverse to the first direction. The film was rolled until clear and the final film thickness was 3–4 mils. The resulting film was greatly increased in toughness as compared with the initial melt-pressed film. Substantially no spherulites were detected in the rolled film when observed in a polarized light microscope.

EXAMPLE 4

Samples of the two-way rolled film of Example 3 were heated to a temperature within the range from 160° C.–180° C., and the films were stretched (at the rate of 12" per minute) in one direction, either in a direction parallel to the first direction of rolling or parallel to the second direction of rolling to form clear, non-fibrillating films having improved tensile properties. The initial film was clear and relatively tough, and it was stretchable and capable of having its tensile strength improved. The examples tabulated in the following table (Table I) indicate that the tensile strength of a clear tough film, e.g., one produced by rolling in one or two directions, may be improved by stretching. In each case, the two-way rolled film was stretched in only one direction, that is, in the direction indicated in the table where MD means the direction in which the film was rolled first and TD means the second direction of rolling.

*Table I*

| Degree of Stretch, Percent | Tenacity (p.s.i.) | | Elongation, Percent | | Modulus (p.s.i.) | | Final Thickness (mils) |
|---|---|---|---|---|---|---|---|
| | MD | TD | MD | TD | MD | TD | |
| MD—50 | 20,000 | 10,000 | 10 | 2 | 545,000 | 495,000 | 2.1 |
| MD—100 | 21,000 | 9,000 | 8 | 2 | 760,000 | 500,000 | 1.2 |
| TD—50 | 15,000 | 10,000 | 10 | 3 | 525,000 | 475,000 | 2.4 |
| TD—100 | 35,000 | 8,000 | 15 | 2 | 750,000 | 600,000 | 1.3 |
| Control—Two-way Rolled | 7,000 | 6,000 | 115 | 82 | 200,000 | 200,000 | 4.0 |

EXAMPLE 5

A relatively higher molecular weight powdered polyoxymethylene having a number average molecular weight of 58,000–59,000 was melt-pressed into the form of a film at 200° C. for 5 minutes under a pressure of about 50 tons per square foot, and thereafter quenched rapidly to room temperature. This melt-pressed film was hazy. The film was rolled in one direction to the extent necessary to convert the film to one substantially free of haziness, and the extent of rolling was 1.5X (50% elongation). Rolling was carried out at substantially room temperature (about 25° C.). The film was then heated to a temperature of 140° C.–155° C. and stretched 3–5X in one direction. Films were only stretched in one direction, and some were stretched in the same direction of rolling and others were stretched in a direction perpendicular to the direction of rolling. The resulting stretched films were clear, tough, and improved in tensile strength in the direction of stretch. The tensile strength of the stretched film (stretched in the same direction as the rolling direction) was twice that of the tensile strength of the initial rolled film (measured in the direction of rolling).

EXAMPLE 6

The relatively higher molecular weight polyoxymethylene film formed by melt-pressing, as described in Example 5, was rolled in mutually perpendicular directions at a temperature of 20° C. (initial film and the rolls were at 20° C.). The film was rolled at a roll speed of 1.4 r.p.m. and the resulting film was rolled to the extent of 1.6X in the first direction of rolling and to an extent of 1.5X in the second direction of rolling. The resultant film was clear and tough.

EXAMPLE 7

The melt-pressed film of relatively higher molecular weight prepared in Example 5 was rolled in mutually perpendicular directions at a roll temperature of 90° C. Initial film temperature was substantially room temperature. The film was rolled to an extent of 2 times in the first direction of rolling and to an extent of 1.5X in the second direction of rolling. The resultant film was clear and tough.

EXAMPLE 8

The melt-pressed film of Example 5 was rolled in one direction at a temperature of 90° C. (roll temperature). The initial film temperature was substantially room temperature. The film was rolled in one direction (MD) to an extent of about 2X. The resulting film was clear and tough.

The following Table II presents a comparison of the average physical properties of the melt-pressed film prepared in Example 5, the two-way rolled films of Examples 6 and 7, and the one-way rolled film of Example 8.

*Table II*

AVERAGE PHYSICAL PROPERTIES OF POLYOXYMETHYLENE FILMS

| Average Physical Properties | Melt-Pressed Film of Example 5 | Two-Way Rolled (at 20° C.) Film of Example 6 | Two-Way Rolled (at 90° C.) Film of Example 7 | One-Way Rolled (at 90° C.) Film of Example 8 | |
|---|---|---|---|---|---|
| Tenacity (p.s.i.) | 9,200 | 9,200 | 11,600 | [1] 28,000 | [2] 7,000 |
| Modulus (p.s.i.) | 360,000 | 250,000 | 290,000 | [1] 330,000 | [2] 380,000 |
| Elongation, percent | 14 | 56 | 36 | [1] 10 | [2] 14 |
| Impact, kg.-cm./mil | 10 | 22 | 28 | 29 | |
| Density, g./cc | 1.400 | 1.393 | 1.393 | 1.395 | |
| Degree of clarity | hazy | clear | clear | clear | |

[1] Measured in the direction of rolling.
[2] Measured transverse to the direction of rolling.

EXAMPLES 9–23, INCLUSIVE

As mentioned hereinbefore, determination of the ratio of $$\frac{\Delta T/To}{\Delta L/Lo}$$

is a guide to the degree of rolling necessary to convert crystalline, spherulitic polyoxymethylene films to clear, transparent films having substantially no spherulites detectable with a visible light microscope. When the above ratio (in one or both directions of rolling) is 0.5 or less, the film is substantially clear and transparent.

In Examples 9–23, inclusive, summarized in Table III, polyoxymethylene films prepared in a manner similar to that described in Example 1, were rolled in two mutually perpendicular directions at one of the roll temperatures indicated in Table III, namely 60°, 70°, or 80° C. In this table the ratios $$\frac{\Delta T/To}{\Delta L/Lo_1}$$

and $$\frac{\Delta T/To}{\Delta L/Lo_2}$$

are those for the first and second direction of rolling, respectively. The pressure exerted upon the film, which was at room temperature just prior to rolling, is expressed in Table III as torque in pounds of force. MD is the direction in which the film was rolled first, and TD is the second direction of rolling.

The examples summarized in Table III show that film transparency becomes substantial when the ratio of $$\frac{\Delta T/To}{\Delta L/Lo}$$

is 0.5 or less.

Table III

| Examples | $\frac{\Delta T/T_o}{\Delta L/L_{o_1}}$ | Torque Pounds Force | $\frac{\Delta T/T_o}{\Delta L/L_{o_2}}$ | Thickness (mils) | Tenacity, p.s.i., At 60° C. | | Elongation, Percent | | Modulus | | Impact, kg./cm./mil | Remarks |
|---|---|---|---|---|---|---|---|---|---|---|---|---|
| | | | | | MD | TD | MD | TD | MD | TD | | |
| 9 | .7 | 35 | .7 | 7 | 9,300 | 9,900 | 22 | 19 | 332,000 | 329,000 | 16.6 | No transparency. |
| 10 | .7 | 50 | .8 | 6 | 8,000 | 13,000 | 27 | 29 | 336,000 | 294,000 | 11.0 | No transparency. |
| 11 | .7 | 60 | .53 | 5.5 | 8,000 | 13,000 | 24 | 26 | 346,000 | 319,000 | 11.0 | Somewhat transparent. |
| 12 | .7 | 70 | .43 | 5 | 8,600 | 18,000 | 20 | 36 | 319,000 | 344,000 | 14.6 | Almost completely transparent. |
| 13 | .7 | 80 | .40 | 4 | 8,300 | 15,000 | 8 | 18 | 349,000 | 324,000 | 19.0 | Good transparency. |

At 70° C.

| 14 | .7 | 35 | .63 | 6 | 8,300 | 13,000 | 16 | 24 | 317,000 | 350,000 | | Faintly transparent. |
|---|---|---|---|---|---|---|---|---|---|---|---|---|
| 15 | .7 | 50 | .59 | 5 | 7,900 | 11,000 | 12 | 24 | 330,000 | 309,000 | | Faintly transparent. |
| 16 | .7 | 60 | .51 | 5 | 8,200 | 14,000 | 33 | 40 | 342,000 | 370,000 | | Almost transparent. |
| 17 | .7 | 70 | .50 | 4.5 | 7,500 | 14,000 | 40 | 41 | 319,000 | 342,000 | | Almost transparent. |
| 18 | .8 | 80 | .44 | 3.5 | 8,200 | 13,000 | 45 | 26 | 354,000 | 328,000 | | Good transparency. |

At 80° C.

| 19 | .7 | 35 | .50 | 5 | 9,700 | 12,000 | 37 | 31 | 333,000 | 283,000 | | Fair transparency. |
|---|---|---|---|---|---|---|---|---|---|---|---|---|
| 20 | .7 | 50 | .42 | 4 | 8,000 | 14,000 | 7.8 | 36 | 295,000 | 272,000 | 21 | Good transparency. |
| 21 | .7 | 60 | .40 | 4 | 9,400 | 18,500 | 14 | 57 | 313,000 | 302,000 | 20 | Good transparency. |
| 22 | .7 | 70 | .39 | 3 | 8,800 | 18,000 | 16 | 41 | 336,000 | 305,000 | 25 | Good transparency. |
| 23 | .7 | 80 | .4 | 3 | 9,400 | 20,000 | 24 | 47 | 345,000 | 312,000 | 27.8 | Good transparency. |

The polyoxymethylene films produced in accordance with this invention are of high clarity and toughness, and the flex life of these films is exceptionally high. Furthermore, the stretched films exhibit relatively high tensile strength in the direction of stretch. Hence, the films are highly advantageous in end uses requiring a film which is tough and does not readily fail upon repeated flexing.

These polyoxymethylene films are useful in a large variety of general applications such as in wrapping and packaging of organic chemicals, greased machine parts, hardware, soap powders, textiles, etc.; in packaging of articles to be sterilized such as bandages, chemicals, ointments, etc.; as a general building material such as luminous ceilings, termite shields, gaskets, etc.; as a fabrication material for animal cages, containers of all varieties, air ducts; in millinery applications such as in garment bags, as a metallic yarn, as upholstery supports, in rope or belt form (fabricated by twisting and/or braiding ribbons); in tapes of all varieties such as pressure-sensitive tapes, recording tapes, tear tapes; as an electrical insulation material, such as in pressure-sensitive electrical tape, slot insulation for motors, in small coils and condensers, as a wrapping for wires and submerged pipes, and as insulation in laminated form with paper and the like; as a general heat insulating material in refrigerators, in laminations with cork sheets or as a wrapping over asbestos insulation in piping; and in a large variety of specific end uses where the material is laminated to flexible and non-flexible substrates such as leather, paper, wood, metals, other types of polymeric films, etc.

We claim:
1. The process which comprises pressure-rolling translucent to opaque crystalline polyoxymethylene film containing detectable spherulites, at a roll temperature not exceeding 120° C. until the film is clear and substantially no sperulites are detectable and thereafter stretching said film at least 20% at a temperature within the range of from 65° C. below the optical melting point range of said polyoxymethylene to said optical melting point range.

2. The process of claim 1 wherein said film is stretched in two mutually perpendicular directions.

3. The process of claim 1 wherein said film is stretched at a temperature within the range of from 120° C. to 180° C.

4. A transparent, stretchable, crystalline polyoxymethylene film which is characterized by having substantially no spherulites and being stretchable to the extent of at least 20%.

5. A transparent, biaxially-oriented, balanced, crystalline polyoxymethylene film characterized by having substantially no spherulites detectable.

6. The process which comprises pressure-rolling at a roll temperature not exceeding 120° C. translucent to opaque crystalline polyoxymethylene film containing detectable spherulites, said film initially having a thickness $T_o$ and a length $L_o$ to a final thickness $T$ and length $L$ such that $$\frac{T_o - T}{T_o} \bigg/ \frac{L - L_o}{L_o}$$

is no greater than 0.5; and thereafter, stretching said film at least 20% at a temperature within the range of from 65° C. below the optical melting point range of said polyoxymethylene to said optical melting point range.

7. The process of claim 6 wherein said film is stretched in two mutually perpendicular directions.

8. The process of claim 6 wherein said film is stretched at a temperature within the range of from 120° C. to 180° C.

References Cited in the file of this patent

UNITED STATES PATENTS

| | | |
|---|---|---|
| 2,176,091 | McClurge et al. | Oct. 17, 1939 |
| 2,244,208 | Miles | June 3, 1941 |
| 2,763,029 | Tulloss | Sept. 18, 1956 |
| 2,768,994 | MacDonald | Oct. 30, 1956 |
| 2,775,570 | Barkdoll et al. | Dec. 25, 1956 |
| 2,899,713 | Lundsager | Aug. 18, 1959 |